United States Patent [19]

Dye et al.

[11] 4,314,742
[45] Feb. 9, 1982

[54] HIGH PERFORMANCE COOLED LASER MIRROR

[75] Inventors: John A. Dye, Lake Park; Peter E. Weber, North Palm Beach, both of Fla.

[73] Assignee: United Technologies Corporation, Hartford, Conn.

[21] Appl. No.: 155,737

[22] Filed: Jun. 2, 1980

[51] Int. Cl.³ .............................................. G02B 5/08
[52] U.S. Cl. ................................................... 350/310
[58] Field of Search ................................ 350/310, 288

[56] References Cited

U.S. PATENT DOCUMENTS

| | | | |
|---|---|---|---|
| 3,637,296 | 1/1972 | McLafferty et al. | 350/310 |
| 3,645,608 | 2/1972 | Staley et al. | 350/310 |
| 3,731,992 | 5/1973 | Mansell | 350/310 |
| 3,836,236 | 9/1974 | Kirk et al. | 350/310 |
| 3,854,799 | 12/1974 | Sciacca et al. | 350/310 |
| 3,854,800 | 12/1974 | Dye et al. | 350/310 |
| 3,863,443 | 2/1975 | Chamberlain | 60/265 |
| 3,884,558 | 5/1975 | Dunn et al. | 350/310 X |
| 3,926,510 | 12/1975 | Locke et al. | 350/310 |
| 3,942,880 | 3/1976 | Zeiders, Jr. | 350/310 |
| 4,006,972 | 2/1977 | Nachtman | 350/310 |
| 4,006,973 | 2/1977 | Zanotti et al. | 350/310 |
| 4,175,834 | 11/1979 | Sigman et al. | 350/310 |
| 4,203,706 | 5/1980 | Hess | 416/97 |
| 4,221,469 | 9/1980 | Stalcup et al. | 350/310 |

FOREIGN PATENT DOCUMENTS 2285620  4/1976  France .............................. 350/310

Primary Examiner—F. L. Evans
Attorney, Agent, or Firm—Harry J. Gwinnell

[57] ABSTRACT

A high power laser mirror is described with minimized heat distortion. The mirror contains a multiplate heat exchanger with a criss-cross channel cooling pattern which significantly increases heat transfer coefficient of the mirror. Mirrors according to the present invention have heat transfer coefficients of up to 40,000.

6 Claims, 5 Drawing Figures

HIGH PERFORMANCE COOLED LASER MIRROR

The Government has rights in this invention pursuant to Contract No. F29601-77-C-0006 awarded by the Department of the Air Force.

TECHNICAL FIELD

The field of art to which this invention pertains is laser mirrors and more particularly high performance laser mirrors having cooling means for decreasing thermal distortions resulting from heat generated by absorption of radiation at the reflective surface of the mirror.

BACKGROUND ART

High performance laser mirrors adapted for use with high power laser beams are subject to severe thermal gradients resulting from the absorption of a portion of the high power beam at the reflective surface of the mirror. The thermal gradients can result in distortion of the mirror with a corresponding distortion in the wave front of the radiation reflected from the reflective surface. One method known in the art for minimizing thermal distortion within mirrors is to flow a coolant through the mirror in heat exchange relationship with the mirror. Typically, either the faceplate of the mirror or the mirror substrate is cooled to minimize the temperature variations within the mirror. Attempts have also been made at selecting particular layered materials which compensate for thermal distortions. U.S. Pat. No. 3,609,589 teaches a materials-compensating approach for correcting thermal distortions. There have been many varieties of coolant flow, heat exchange systems for minimizing thermal distortions. Note U.S. Pat. Nos. 3,637,296; 3,645,608; 3,836,236; 3,854,799; 3,854,800; 3,926,510; 3,942,880; 4,006,972; 4,006,973 and 4,175,834. However, even such cooled laser mirrors while improving the performance of the laser mirrors leave much room for improvement.

DISCLOSURE OF INVENTION

A high power laser mirror with significantly reduced distortion has been invented. A system of criss-cross coolant passages in a multiplate laser mirror heat exchanger between the mirror surface and mirror substrate produces a significant increase in heat transfer coefficient, coolant flow rate capability and substrate isolation with minimum fluid pressure loss. Such a system produces added turbulence, flow mixing, and interfacial fluid shear mixing, all which contribute to heat transfer coefficients far in excess of anything obtainable with current state of the art mirrors.

One aspect of the invention includes an open-face coolant passage mirror arrangement with direct fluid flow communication between first and second plate coolant fluid channels.

Another aspect of the invention includes a closed face coolant passage mirror arrangement with an intervening layer between first and second plate coolant fluid channels, preventing direct fluid flow communication between first and second plate coolant fluid channels.

BEST MODE FOR CARRYING OUT THE INVENTION

Figure 1:
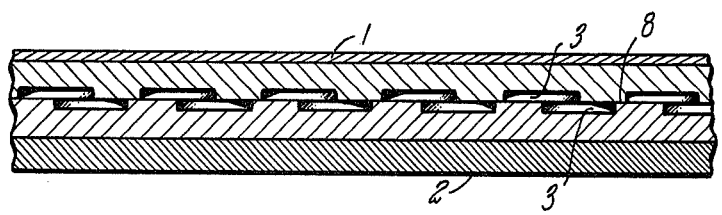
FIG. 1 demonstrates an open-face laser mirror embodiment according to the present invention.

FIG. 1 demonstrates a sectional elevation of an open-face mirror embodiment according to the present invention where 1 indicates the reflecting mirror surface, 2 indicates the mirror substrate surface, and 3 indicates the coolant fluid passages. This arrangement is preferred since the direct access of the coolant fluids in the first and second plate passages in direct fluid flow communication provide for additional turbulence generation and flow mixing for increased boost in heat transfer coefficient and uniformity in cooling. In an exemplary system according to the present invention, the mirror surface had a thickness of approximately 0.011 in. with cooling channels approximately 0.031 in. wide, 0.015 in. deep, spaced 0.015 in. apart. The channels had a depth of approximately 0.015 in. While any heat conductive metal can be used in the mirror fabrication, copper and molybdenum are preferred. Similarly, while any conventional mirror surface may be used, silver overcoated with thorium fluoride is preferred.

Figure 2:
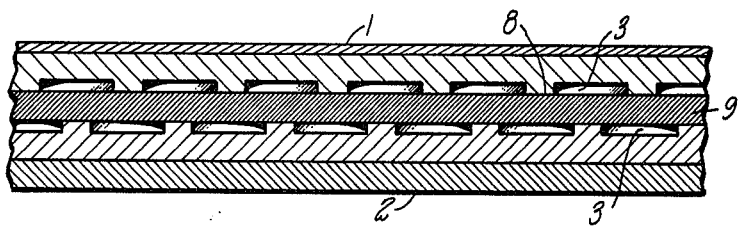
FIG. 2 demonstrates a closed-face laser mirror embodiment according to the present invention.

FIG. 2 demonstrates a sectional elevation of a closed-face laser mirror embodiment according to the present invention which in addition to providing uniformity of cooling provides added composite bond strength over the open-face embodiment. In FIG. 2, as in FIG. 1, 1 indicates the laser reflecting surface, 2 the mirror substrate, and 3 the coolant fluid passages. Character 9 indicates the interventing heat conductive wall which while eliminating the turbulent mixing and fluid shear and its positive cooling effects does provide for enhanced bonding through additional bonding areas 8. Furthermore, the crossing channel configuration plus the intervening wall 9 provides for a "smearing out" of intensity hot spots or intensity shadows further contributing to uniformity of heat distribution minimizing mirror distortion. This wall is preferably a heat conductive material such as copper or molybdenum.

Figure 3:
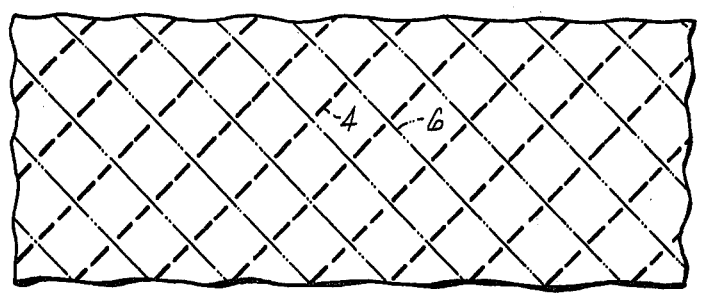
FIG. 3 demonstrates schematically a straight line channel design according to the present invention.
Figure 4:
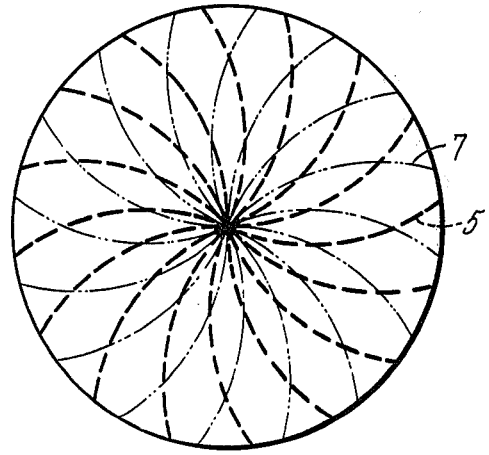
FIG. 4 demonstrates schematically a curved line, spiral channel design according to the present invention.

FIGS. 3 and 4 demonstrate schematically top plan views of cooling patterns according to the present invention, FIG. 3 being a straight channel arrangement and FIG. 4 being a curved channel spiral arrangement. The thicker broken lines 4 and 5 in FIGS. 3 and 4 respectively, indicate the first plate coolant passages and the thinner broken and dotted lines 6 and 7 in FIGS. 3 and 4, respectively indicate the second plate coolant passages in the heat exchanger portion of the laser mirrors. As noted from the Figures, the patterns are reversed in the first and second plate sections of the coolant passages to provide the superior cooling characteristics in the mirrors of the present invention. While a substantially parallel channel pattern is preferred (note FIGS. 3 and 5) any pattern which provides angular offset of opposing, i.e. facing, channels in the first and second plate sets is acceptable, e.g. a wavy pattern, etc. The channel pattern design selected will depend primarily on the geometry of the incident beam. For example, for an incident beam with a circular cross section geometry, a spiral pattern would be preferred.

The channels may be any desired shape, for example having a square, rectangular, semi-oval, semi-circular, etc. cross section with semi-oval being preferred from an ease of fabrication (e.g. easily etched) standpoint. The particular pattern is also a matter of choice with the spiral criss-cross pattern preferred for circular mirrors and the straight line criss-cross pattern preferred for square or rectangular mirrors.

Both the open-face and closed-face systems have advantages based on the particular systems in which they will be used. The open-face system has the advantage of cross communication and intermixing of coolant fluid during use. This will provide greater heat transfer coefficient efficiencies. The closed-face system, while not providing for the direct intermixing between channels, does provide a greater bond area between the plates, allowing for a stronger, more rugged mirror system. As can be seen from the figures, the cooling channels in the first plate are substantially parallel to one another both in the straight channel (FIG. 3) and curved channel (FIG. 4) arrangements. The channels in the second plate are similarly substantially parallel but in a pattern opposite that of the first plate, so as to produce the criss-cross channel pattern in combination. As demonstrated by FIGS. 3 and 4, opposite can be seen to mean an inverse mirror image such that when the two plates are placed together the channels are not concurrent as they would be in a regular mirror image pattern, but angularly offset one from the other. It should also be obvious that while cooling fluid inlet and outlet manifolds have not been shown, conventional manifolding can be used which would be within the purview of one skilled in this art. It should also be noted that the spacing of the channels in the open-face system is a design feature which could capture advantages of both systems. For example, if cross communication between cooling channels is desired with a greater degree of bonding, the channels may be more widely spaced so as to provide additional bond area while maintaining cross communication. Again, it will be a design consideration based on the needs of the particular system being utilized. The bond area is indicated as 8 in FIGS. 1 and 2.

As stated above, the laser mirror system of the present invention provides for a significant increase in heat transfer coefficient and substrate isolation for minimum fluid pressure loss, which can be a problem in channeled laser mirror fluid coolant systems. The scheme of the present invention is particularly attractive for high flux mirrors because it offers heat transfer coefficients of up to 40,000 BTU/hr/ft$^2$/°F. as compared to current state of the art coefficients for channel cooled systems of up to 25,000 BTU/hr/ft$^2$/°F. The crossing pattern also minimizes contact/conduction area between the plates and thus significantly reducing the amount of heat conducted into the substrate which can contribute to warp.

The two plates which make up the heat exchanger can have their passages etched or machined into the respective sides. The passages can be any size necessary based on thermodynamic calculations or experimental data to accommodate the particular mirrors being used. Where a closed-face pattern is being used, the intervening wall is preferably approximately the thickness of the channel passages.

The open-face coolant channels act as turbulence generators and flow mixers because of the interfacial fluid shear mixing which occurs each time the fluids cross each other. This provides an additional boost in heat transfer coefficient. The elimination of a plate between the first and second channel passages in the open-face embodiment, also reduces the mass of the heat exchanger which also lowers heat exchanger induced thermal distortion. With the arrangement according to the present invention, the open-face fluid mixing and closed-face coolant "smearing" averages out the fluid temperature rise to whatever level is required. Even cooled areas formed, e.g. by shadows from support struts are evened out by the criss-cross pattern according to the present invention. The passages can be sized for whatever flow rate is required to produce such effects. The same level of cooling as conventional separate parallel passage mirror designs can be achieved with lower coolant flow rates and comparable supply pressures. For example, for equal amounts of pressure across the channel, the criss-cross pattern showed better cooling than conventional parallel patterns. Accordingly, the flow rates can be reduced still allowing for very good cooling. The turbulence and mixing contributes substantially to this. The amount of heat conducted into the substrate according to the present invention is reduced since the only conduction path is at the locations where the passage lands cross each other.

The open-face embodiment significantly reduces the metal contact and therefore the heat conduction pass between upper and lower passages. This reduces conduction, thermally isolating the substrate from the effects of the incident beam heat load thereby reducing substrate induced distortions. This reduction can be as large as 75% and would, therefore, have a major impact on eliminating mirror distortion.

Figure 5:
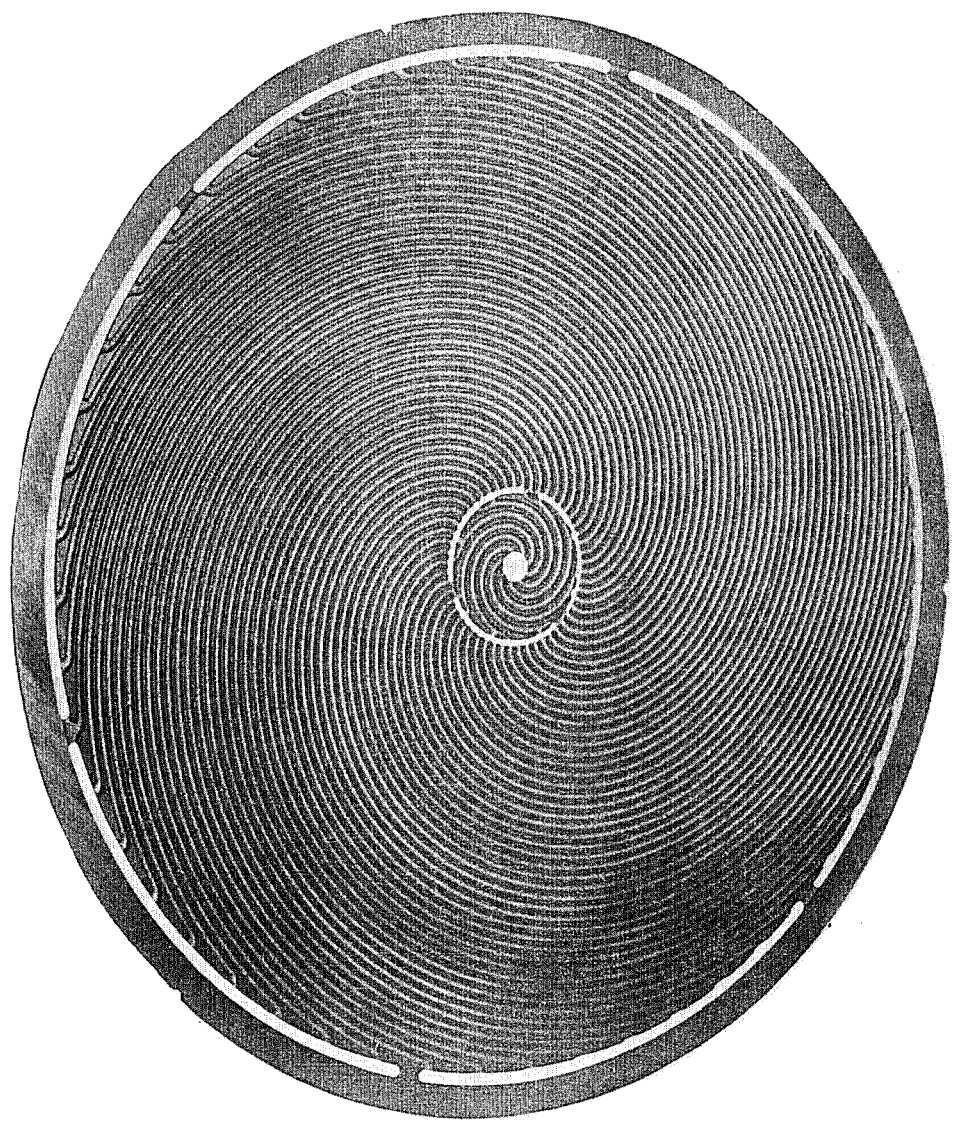
FIG. 5 demonstrates an actual curved line, spiral channel design according to the present invention.

FIG. 5 demonstrates an actual plate with a spiral channel pattern according to the present invention. It should also be noted that while the mirror system of the present invention has been described in terms of a single first and second plate set, it should be noted that multiple plate set systems may also be used, if desired.

Although the invention has been shown and described with respect to detailed embodiments thereof, it should be understood by those skilled in the art that various changes and omissions in form and detail may be made therein without departing from the spirit and the scope of the invention.

We claim:

1. A high power, cooled, laser mirror comprising:
a mirror surface;
a heat exchanger in heat transfer communication with the mirror surface;
the mirror surface and the heat exchanger supported on a mirror substrate; wherein the heat exchanger contains fluid cooling channels formed by, in combination, the opposing cooling channels of a first plate and second plate, the cooling channels in each plate being angularly offset with respect to the nearest adjacent cooling channel of the opposing plate thereby forming a criss-cross cooling channel pattern and the opposing, angularly offset cooling channels disposed in direct fluid flow communication with each other.

2. A high power, cooled, laser mirror comprising:
a mirror surface;
a heat exchanger in heat transfer communication with the mirror surface;
the mirror surface and the heat exchanger supported on a mirror substrate; wherein the heat exchanger contains fluid cooling channels formed by, in combination, the opposing cooling channels of a first plate and second plate, the cooling channels in each plate being angularly offset with respect to the nearest adjacent cooling channel of the opposing plate thereby forming a criss-cross cooling channel pattern and containing an intervening heat conductive fluid smearing layer between the first and second plates preventing direct fluid flow communication between the cooling channels of the first and second plates.

3. The laser mirror of claims 1, or 2 having a cooling coefficient of up to 40,000 BTU/hr/ft$^2$/°F.

4. The laser mirror of claims 1, or 2 wherein the cooling channels in each plate are substantially parallel.

5. The laser mirror of claims 1, or 2 wherein the cooling channels in each plate are in a substantially spiral pattern.

6. The laser mirror of claim 5 wherein the channels of the spiral pattern are substantially parallel.

* * * * *